(No Model.)
J. McGINLEY.
LUBRICATOR.
No. 570,605. Patented Nov. 3, 1896.
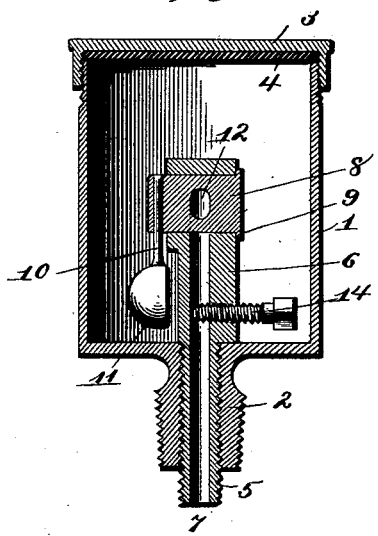
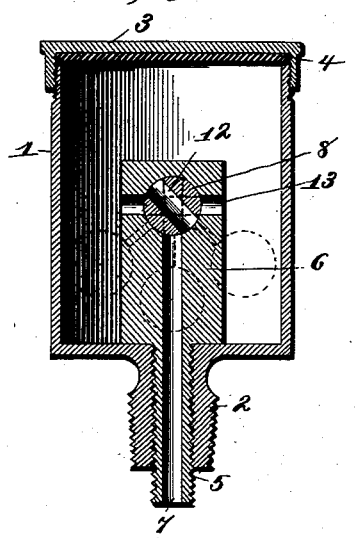
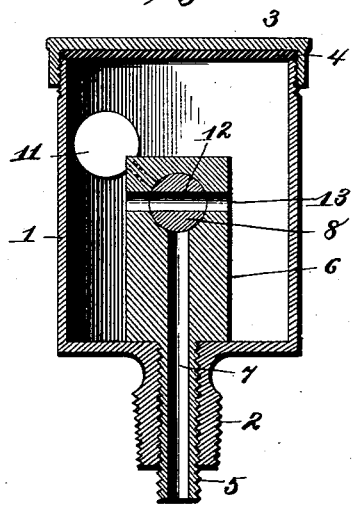
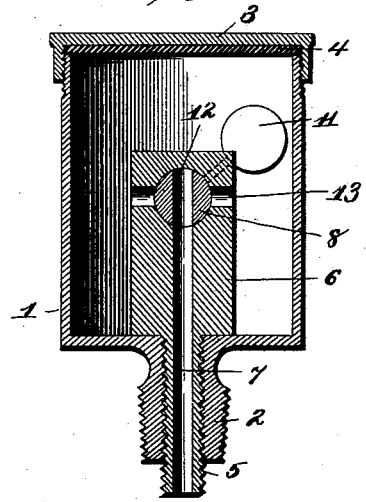
Witnesses
E. C. Wurdeman
A. J. Williamson
Inventor
James McGinley
By Geo. H. Holgate
Attorney

UNITED STATES PATENT OFFICE.

JAMES McGINLEY, OF KINGSTON, PENNSYLVANIA, ASSIGNOR OF TWO-THIRDS TO JAMES H. BRODERICK AND JAMES H. KENNEY, OF PARSONS, PENNSYLVANIA.

LUBRICATOR.

SPECIFICATION forming part of Letters Patent No. 570,605, dated November 3, 1896.

Application filed January 2, 1896. Serial No. 574,144. (No model.)

*To all whom it may concern:*

Be it known that I, JAMES MCGINLEY, a citizen of the United States, residing at Kingston, in the county of Luzerne and State of Pennsylvania, have invented certain new and useful Improvements in Automatic Oilers, of which the following is a specification.

My invention relates to a new and useful improvement in automatic oilers, and has for its object to provide such a device which will deliver to the bearing to be oiled a given quantity of lubricant upon each revolution or oscillation of said bearing.

With these ends in view the invention consists in the details of construction and combination of elements hereinafter set forth, and then specifically designated by the claims.

In order that those skilled in the art to which my invention appertains may understand how to make and use the same, I will describe its construction and operation in detail, referring by number to the accompanying drawings, forming a part of this specification, and in which—

Figure 1 is a central vertical section of my improvement, showing the pendulum in position for use in connection with rotary machinery; Fig. 2, a similar view taken at right angles to Fig. 1; Fig. 3, a similar view showing the pendulum in position for use in connection with oscillating machinery and the automatic valve in its closed position; and Fig. 4 is a similar view showing the automatic valve in its opposite position.

Similar numbers denote like parts in the views of the drawings.

1 is a cup or gland having a threaded stem 2, by means of which it is secured within a suitable opening in the bearing to be lubricated in the ordinary manner, and 3 is a cap adapted to be threaded upon the upper end of the cup, and the washer 4 may be interposed between said cap and cup for the purpose of making a tight joint. The stem 2 is provided with a central opening so threaded as to receive the threaded rod 5, which is formed with the post 6, and the latter is provided with a central opening 7, extending from the lower end of the rod up through the post within a short distance of the top thereof, and is intersected by a cross-opening of sufficient size to receive the plug-valve 8. This valve is adapted to turn within this opening and is held in place by the head 9, formed upon one end thereof, and the pin 10 inserted in a suitable hole in the opposite end. This pin also serves to support the pendulum 11, by means of which motion is imparted to the valve, as and for the purpose hereinafter set forth.

12 is a hole passing diametrically through the plug, and 13 is a hole of similar diameter, extending through the post in alinement with the hole 12 when the latter is in a horizontal position, so that when the cup is in place upon a rotary part of a machine, such as a pulley or crank-pin bearing, the pendulum will swing to and fro upon each revolution of each part within the limits indicated by the dotted pendulum in Fig. 2, and the result of this movement which will be imparted to the valve will be that the hole 12 is brought into alinement with the hole 13, and therefore filled by the lubricant in the cup and then carried into alinement with the hole 7 when the cup is in its upright position, whereby the lubricant will flow down through the hole 7 into the bearing to be lubricated, and as this operation is repeated at every revolution of the part to which the cup is attached it will be seen that a given amount of oil is delivered to the bearing, which is no more nor less as long as the hole 7 is unobstructed. The quantity thus delivered will be in proportion to the capacity of the hole 12.

In order that the flow of oil to the bearing may be regulated independent of the capacity of the hole 12, the screw 14 is threaded through one wall of the post and its end permitted to project within the hole 7, so that by adjustment of this screw in or out the passage in the hole may be regulated.

It is to be observed that while the holes 12 and 13 are at a considerable distance from the bottom of the cup, yet they will be fed with the oil contained within said cup on account of the latter being turned upside down during its revolution with the moving part of the machinery.

In case of oscillating parts of machinery the application of the cup is similar in all respects to that just described in connection with revolving parts, with the exception of the position of the pendulum in said cup, which is reversed to the position shown in Figs. 3 and 4, so as to be above the horizontal. Thus when the oscillating part, to which the cup is attached, is reversed in its movement the inertia of the pendulum will cause it to move from one side to the other, thus bringing the valve first into the position shown in Fig. 3 and then into the position shown in Fig. 4, whereby the hole 13, after being alined with the hole 7 for the same purpose and with the same result as that above described.

It will be understood that the pendulum is limited in its movements in both cases by striking against the sides of the cup, as indicated in dotted lines in Fig. 2. By this construction the inconvenience which has heretofore been experienced in connection with oiling moving parts of machinery—such as a surplus flow of oil or a continued flow thereof when the parts are at rest—is entirely overcome, as only a given quantity of lubricant will be fed to the bearing, and when the machinery is at rest the flow will be entirely cut off.

Having thus fully described my invention, what I claim as new and useful is—

1. In a device of the character described, a cup, a post secured within the cup having an oil-passage passing therethrough and a valve-seat intersecting said passage, a valve journaled in the valve-seat and having a flange on one end and a pendulum on the other, said valve and post having an oil-outlet which is adapted to be opened and closed by the action of the pendulum and a set-screw threaded in the post to regulate the flow through the oil-passage, as and for the purpose described.

2. In a device of the character described, a cup, a post therein having an oil-passage and a valve intersecting the oil-passage and having a flange on one end and a pendulum on the other, as and for the purpose described.

In testimony whereof I have hereunto affixed my signature in the presence of two subscribing witnesses.

JAMES McGINLEY.

Witnesses:
S. S. WILLIAMSON,
J. F. O'NEILL.